UNITED STATES PATENT OFFICE.

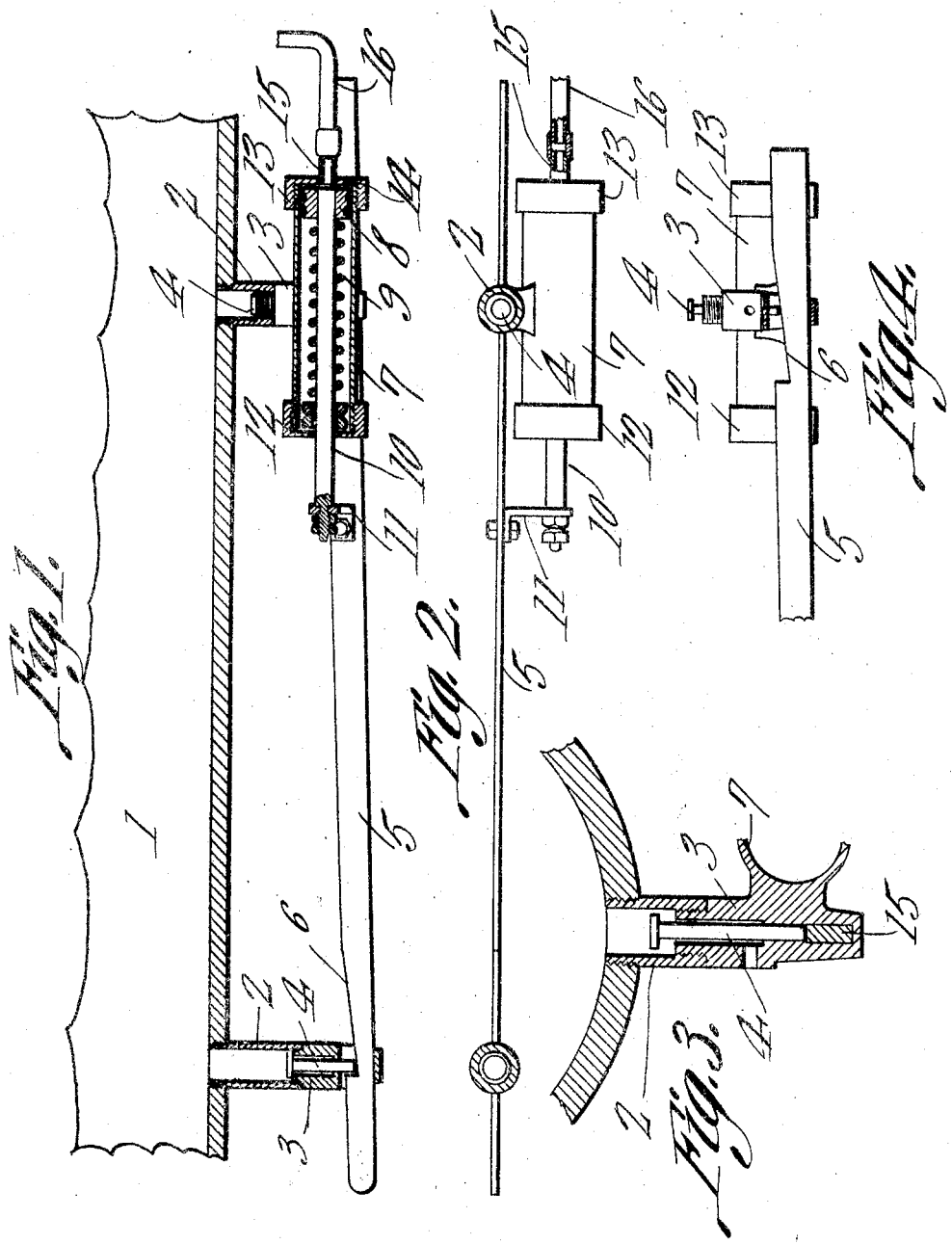

GEORGE F. EDWARDS, OF TEXARKANA, TEXAS, ASSIGNOR OF ONE-HALF TO MARTIN D. TILSON, OF TEXARKANA, TEXAS.

RELIEF-VALVE GEAR.

1,039,914.

Specification of Letters Patent.

Patented Oct. 1, 1912.

Application filed March 24, 1911, Serial No. 616,627. Renewed August 23, 1912. Serial No. 716,749.

*To all whom it may concern:*

Be it known that I, GEORGE F. EDWARDS, a citizen of the United States, residing at Texarkana, in the county of Bowie and State of Texas, have invented a new and useful Relief-Valve Gear, of which the following is a specification.

This invention has relation to gears for releasing valves especially adapted to be used upon the cylinders of locomotive engines and it consists in the novel construction and arrangement of its parts as hereinafter shown and described.

The object of the invention is to provide a gear of simple structure which is adapted to be operated by fluid pressure to open the relief valve the parts being so arranged that they may be easily and readily disconnected for inspection and other purposes.

In the accompanying drawings,—Figure 1 is a side elevation of the gear with parts in section. Fig. 2 is a plan view of the gear with parts in section. Fig. 3 is a transverse sectional view of one of the relief valves of the engine cylinder. Fig. 4 is a side elevation of one of the relief valves and attached parts.

The engine cylinder 1 is provided in the vicinity of its ends with nipples 2 which in turn are provided with casings 3 screw-threaded therein and containing relief valves 4 of usual pattern. A bar 5 is slidably mounted in the casings 3 and is provided with upper inclined edges 6 upon which the stems of the valves 4 ride. A cylinder 7 is fixed to one of the depending valve casings 3 and a piston 8 is mounted for reciprocation in the said cylinder. A coiled spring 9 surrounds a piston rod 10 which passes through the inner end or head of the cylinder and is located in the cylinder 7. The said spring is interposed between an end portion of the cylinder and the piston 8 and is under tension with a tendency to hold the piston 8 toward one end of the cylinder. A bracket 11 is attached to the bar 5 at a point between the valve casing 3 and one end of the piston rod 10 is detachably connected with the said bracket. Heads 12 and 13 are screw-threaded upon the cylinder 7 and the outer head 13 is provided with a drip outlet 14 and a nipple 15. A steam pipe 16 is connected with the nipple 15.

In operation when it is desired to open the relief valve 4 steam is permitted to pass through the pipe 16 and nipple 15 into the end of the cylinder 7 behind the piston 8. Said piston is thus forced from one end toward the other end of said cylinder and the bar 5 is moved longitudinally whereby the inclined edge portions 6 will lift the valves 4 off of their seats. When the steam is cut off from the pipe 6 that remaining in the cylinder 7 may pass through the outlet 14, also any condensation that takes place in the cylinder 7 may pass out through the said outlet 14. When it is desired to inspect the piston 8 the head 12 may be removed from the cylinder 7 by unscrewing the same and the bar 5 may be moved longitudinally whereby the piston 8 will be removed from within the cylinder 7. When it is desired to remove the cylinder 7 from the nipple 2 to which it is attached, the piston 8 is removed from within the cylinder as above described and the coupling between the pipe 16 and 15 is removed thus the cylinder may be unscrewed from the nipple 2 upon which it is mounted.

The piston rod 10 and the bar 5 lie in parallel vertical planes and the piston rod 10 is arranged horizontally while the bar 5 is in a slight inclined position. Thus upon the piston rod 10 being forced inwardly, the piston rod 10 and the bar 5 being at a slight angle with respect to each other, causes the bracket 11 to swing the bar 5 within the casings 3 to increase the frictional contact between the said bar and the casings when the piston rod is forced inwardly. This serves as a means for preventing the excessive inward movement of the piston rod and also prevents the spring 9 from becoming buckled or crushed within the cylinder.

Having described the invention what I claim as new and desire to secure by Letters Patent is:—

The combination with a cylinder provided with a nipple at each end thereof, of a casing engaged with each nipple, a valve mounted in each casing having a depending stem, a bar slidably mounted in the casing and having inclined edges upon which the said stems ride, a bracket secured to the said bar intermediate the said casings, a cylinder fixed to one of the valve casings, a piston mounted for reciprocation within the cylinder, a piston rod passing through the inner end of the cylinder and connected to the said bracket, and a fluid pressure pipe coupled to the other end of the cylinder and communicating with the interior thereof, the said bar and piston rod being at a slight angle with respect to each other.

In testimony that I claim the foregoing as my own, I have hereto affixed my signature in the presence of two witnesses.

GEORGE F. EDWARDS.

Witnesses:
A. G. COLEMAN,
AARON D. DAVIDSON.